United States Patent [19]
Norris et al.

[11] 3,785,675
[45] Jan. 15, 1974

[54] MOBILE HOME SKIRTING

[76] Inventors: George F. Norris, 1920 Kiowa Dr., Lafayette, Ind. 47905; Gerald K. Robbins, 101 S. 31st St., Lafayette, Ind. 47904

[22] Filed: Mar. 20, 1972

[21] Appl. No.: 236,309

[52] U.S. Cl. ........................... 280/150 R, 52/DIG. 3
[51] Int. Cl. ............................................. B60r 27/00
[58] Field of Search ................................ 280/150 R; 52/DIG. 30, 169, 69, 122

[56] References Cited
UNITED STATES PATENTS
3,218,091 11/1965 Doak .............................. 280/150 R
3,042,425 7/1962 Cathey ........................... 280/150 R
2,988,380 6/1961 Puckett .......................... 280/150 R

*Primary Examiner*—Robert R. Song
*Attorney*—C. David Emhardt

[57] ABSTRACT

Skirting for attachment to a mobile home. The skirting includes a plurality of skirt assemblies each pivotally connected to the bottom edge of the trailer so as to be swingable outward and upwardly to a stored position. Each skirt assembly includes a pair of telescopically constructed vertical posts having cross bars connected thereto. The lower cross bar is telescopic so as to maintain parallelism between the posts even though they are extended to different lengths. Panels are mounted to the cross bars by means of clips. The panels are connected together by interlocking slides.

5 Claims, 6 Drawing Figures

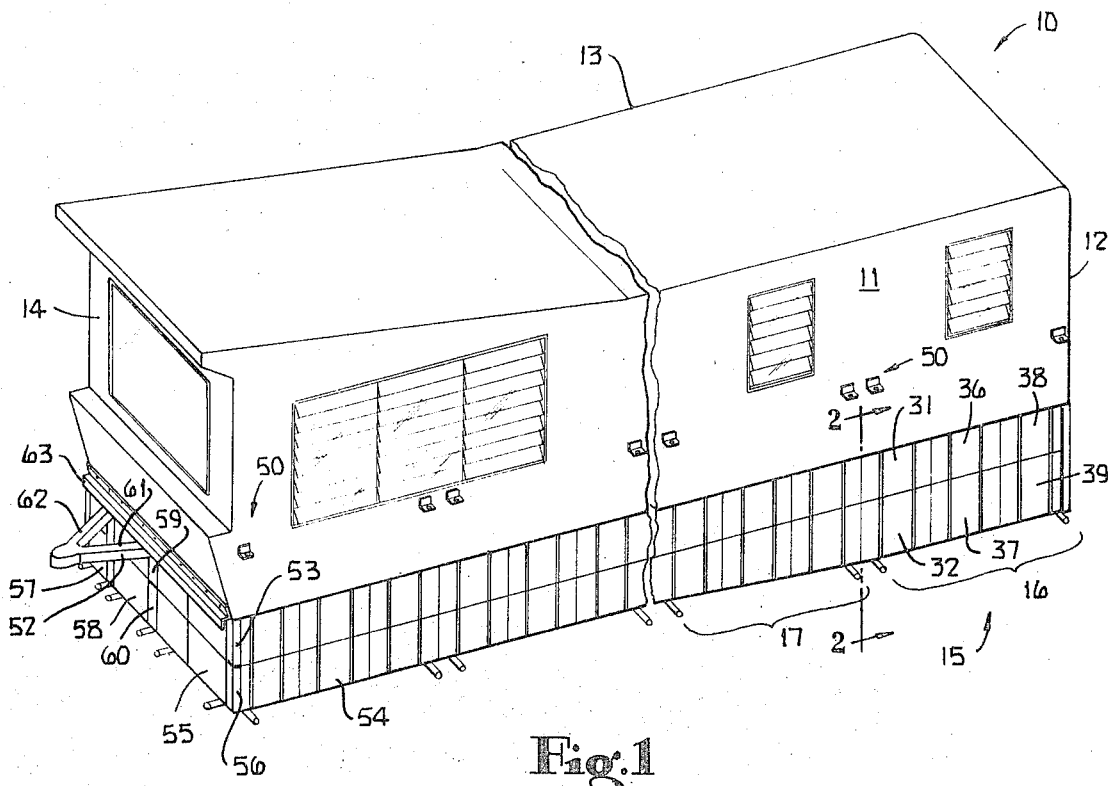
Fig.1
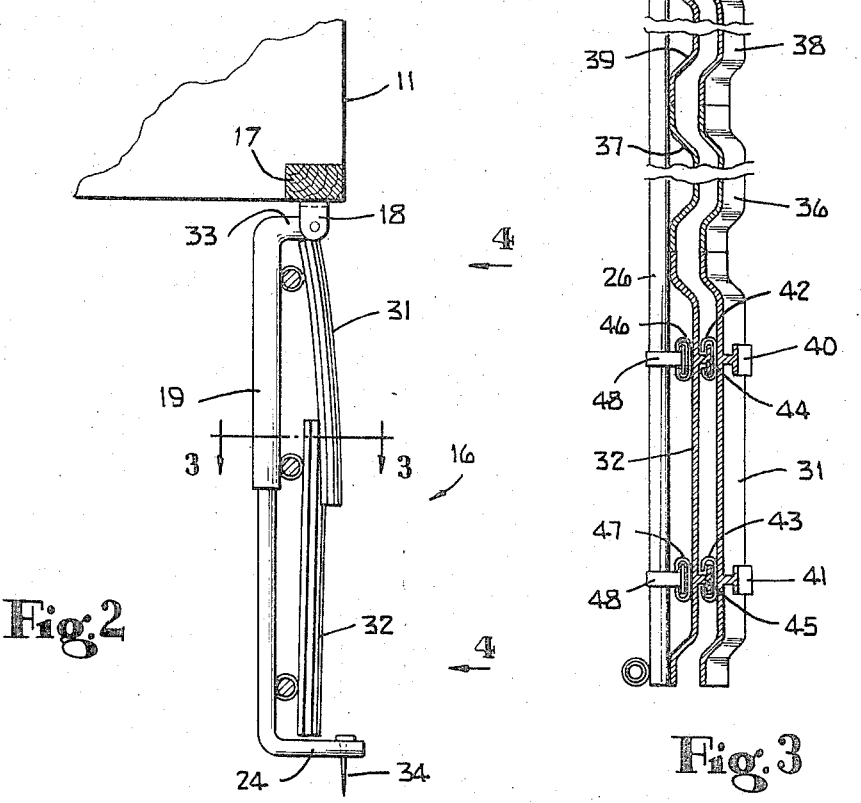
Fig.2
Fig.3

3,785,675

MOBILE HOME SKIRTING

BACKGROUND OF THE INVENTION

1. Field of the Invention

This invention is in the field of skirting for trailers.

2. Description of the Prior Art

A representative sample of the prior art is disclosed in the following U. S. patents:

2,634,462 issued to N. E. Graven;
3,004,769 issued to A. R. A. Turner;
3,113,357 issued to W. B. Reukauf; and,
3,537,218 issued to M. F. Hindman.

Many types of skirts have heretofore been proposed for mounting to trailers; however, such skirts have not been completely satisfactory because they do not extend adjacent to the ground when the distance from the bottom of the trailer to the ground varies around the circumference of the trailer. Many of the prior art skirting requires complete disassembly whenever the trailer is being moved from one location to another location. A mobile home having the skirting disclosed herein may be easily moved with the skirting on, by simply swinging the skirt frames out and up adjacent to the side of the home. This position is also used to gain access to the underside of the mobile home for maintenance or storage. My mobile home skirting has been designed to allow installation by the mobile home dweller with little effort in a minimum amount of time.

The skirting includes a plurality of individual skirt assemblies each of which are adjustable downward to the ground. In addition, each skirt assembly is adjustable for variations in ground contour along the length of the skirt assembly.

SUMMARY OF THE INVENTION

One embodiment of the present invention is a skirting for mounting to a mobile trailer comprising a mounting bracket securable to the trailer, a frame having a top end portion pivotally mounted to the bracket, the frame being pivotable on the bracket outward and upward from a vertical position beneath the trailer to a stored position exteriorly against the trailer, the frame including vertical telescopic posts connected together, a top panel mounted on the frame, a bottom panel mounted on the frame and telescopically connected to the top panel and being extendable therefrom as the posts are telescoped against the ground, and, means mounting the top panel and the bottom panel to the frame.

It is an object of the present invention to provide a new and improved skirting for a mobile trailer.

It is the further object of the present invention to provide a mobile trailer skirting which may be repositioned in a stored condition without necessitating disassembly of the skirting.

It is yet another object of the present invention to provide skirting for a mobile trailer which extends in abutting relationship with the ground even though the ground contour varies.

Related objects and advantages of the present invention will be apparent from the following description.

BRIEF DESCRIPTION OF THE DRAWING

FIG. 1 is a fragmentary perspective view of a mobile home with the skirt incorporating the present invention mounted thereto.

FIG. 2 is an enlarged fragmentary cross sectional view taken along the line 2—2 of FIG. 1 and viewed in the direction of the arrows.

FIG. 3 is an enlarged cross sectional view taken along the line 3—3 of FIG. 2 and viewed in the direction of the arrows.

DESCRIPTION OF THE PREFERRED EMBODIMENT

Figure 4:
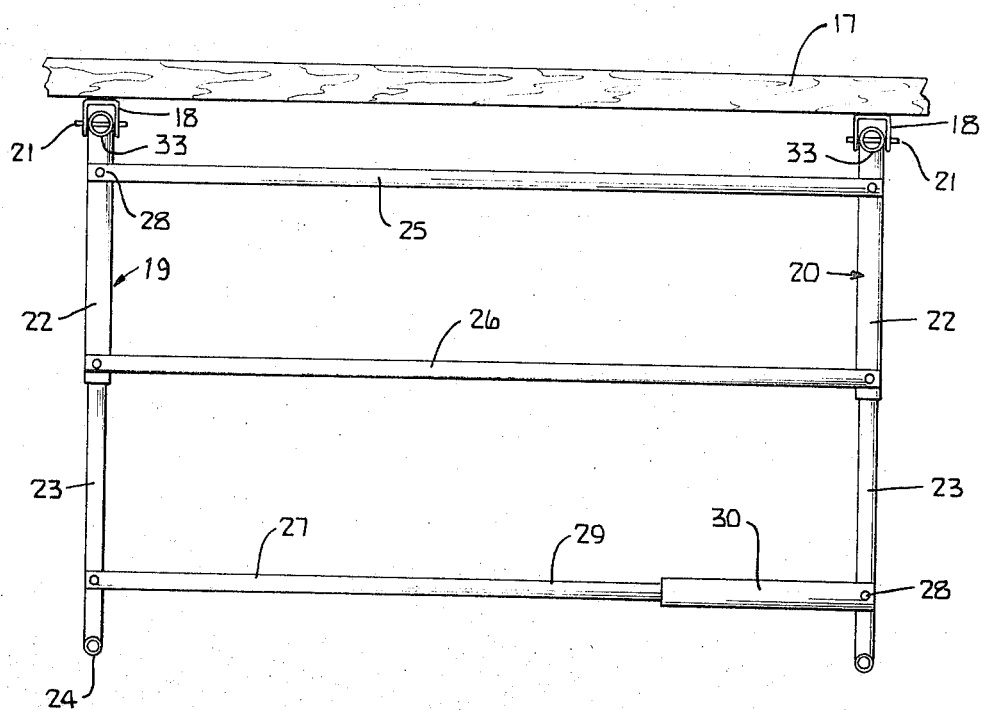
FIG. 4 is a side view of the skirt of FIG. 2 looking in the direction of arrows 4—4 with the outer panels removed from the frame.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a mobile home or trailer 10 having a pair of side walls 11 and 13, a back wall 12 and a front wall 14. Skirting 15 is mounted to the bottom edge of the trailer adjacent to walls 11 through 14 and completely surrounds the trailer thereby concealing the structure beneath the trailer. Skirting 15 includes a plurality of individual skirt assemblies, two of which are shown as skirts 16 and 17.

Skirt 16 will now be described it being understood that a similar description applies to the other skirts attached to wall 11 as well as the individual skirt assemblies attached to walls 12, 13 and 14. Skirt 16 includes three top panels and three bottom panels mounted to a frame which is pivotally mounted to the trailer. For example, top panels 31, 36 and 38 and bottom panels 32, 37 and 39 are mounted to the same frame. The panels have been removed from the frame in FIG. 4 so as to clearly illustrate the frame. The frame includes a pair of vertical posts 19 and 20 which are connected together by cross bars 25, 26 and 27. A pair of mounting brackets 18 are fixedly fastened to beam 17 which forms the main trailer frame. Each mounting bracket has a pair of spaced apart downwardly extending walls which receive the top end portion 33 (FIG. 2) of each post 19 and 20. Pins 21 secure ends 33 of the post to the mounting brackets so that the skirt frame is pivotally mounted to the brackets. That is, the skirt frame may be pivoted outward and upward from a vertical position beneath the trailer to a storage position located exteriorly against wall 11 of the trailer. As will be described later, the skirt may therefore be stored by simply pivoting the skirt upward against the side wall of the trailer.

Each vertical post is telescopically constructed and includes a tube 22 into which a smaller tube 23 is slidably mounted. A pair of rigid cross bars 25 and 26 are secured to tubes 22 of posts 19 and 20 by conventional fastening means 28 such as by rivets. The bottom cross bar is telescopic and includes tube 30 having one end pivotally secured by fastening means 28 to tube 23 of post 20 whereas the opposite end of tube 30 slidably receives a smaller diametered tube 29 whose opposite end is pivotally secured to tube 23 of post 19. Cross bars 25 and 26 insure that posts 19 and 20 are always vertical and parallel. Cross bar 27 is telescopically constructed so that the length of the cross bar will change in the event that posts 19 and 20 are adjusted to different lengths. Horizontal feet 24 (FIG. 2) are integrally connected to tubes 23 of posts 19 and 20 and are each provided with an aperture to receive a stake 34 which is inserted through each foot into the ground thereby anchoring the frame to the ground.

Figure 5:
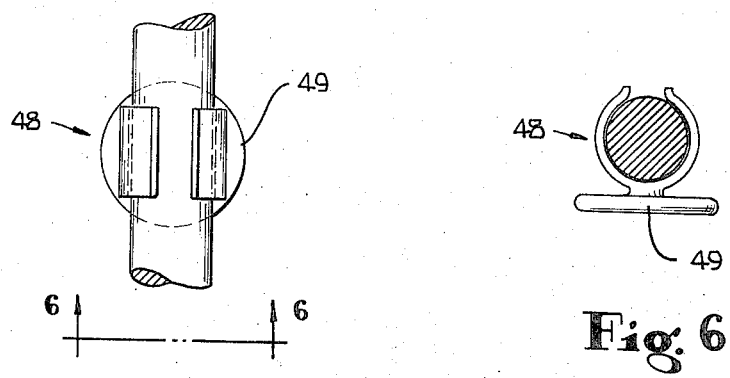
FIG. 5 is an enlarged view of one of the clips mounted on the frame for the attachment of the panels.
Figure 6:
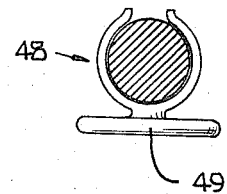
FIG. 6 is an end view of the clip of FIG. 5 looking in the direction of arrows 6—6 with the frame shown in cross section.

Panels 31 and 32 will now be described it being understood that a similar description applies to panels 36 through 39 as well as the other panels forming the skirt assemblies. A pair of T-shaped ridges 40 and 41 (FIG. 3) are mounted to panel 31 against the exterior surface thereof. A pair of C-shaped channels 42 and 43 are mounted to panel 31 against the interior surface thereof and are aligned with ridges 40 and 41. The ridges and channels are parallel and extend from the top edge of panel 31 to the bottom edge of the panel. Likewise, a pair of T-shaped ridges 44 and 45 identical to ridges 40 and 41 are mounted to the exterior surface of bottom panel 32 and are slidable within channels 42 and 43. Also, a pair of C-shaped channels 46 and 47 identical to channels 42 and 43 are mounted to bottom panel 32 on the interior surface thereof. A plurality of clips 48 having spring biased arms which releasably engage the cross bars of the frames. Each clip 48 (FIGS. 5 and 6) have a circular base 49 which may be positioned within the channels attached to panels 31 and 32. Since the bases 49 are circular, the bases will rotate and move within the channels. As shown in FIG. 1, the skirt assemblies are adjusted to different lengths depending upon the contour of the ground. That is, the horizontal feet of each skirt assembly is movable against the ground. In certain cases, the vertical posts of a single skirt assembly such as skirt assembly 17 will be extended to different lengths. Thus, telescopic cross bar 27 (FIG. 4) will not be parallel to bars 25 and 26 since post 19 will be adjusted to a length different than post 20. In this case, to maintain the parallel relationship between posts 19 and 20, the circular bases 49 of the clips connecting bottom panel 32 to bar 27 will move and rotate within channels 46 and 47 (FIG. 3) as the vertical post and skirt are adjusted to the length required for the horizontal feet to abut the ground. As the vertical posts are extended, bottom panel 32 will move downwardly from top panel 31 with ridges 44 and 45 sliding within channels 42 and 43. Thus, the bottom panel is telescopically connected to the top panel and is extendable therefrom as the vertical posts are telescoped against the ground. Bars 25 through 27 connect posts 19 and 20 together with bar 25 being positioned adjacent the top panel and bars 26 and 27 positioned against the bottom panel. As shown in FIG. 2, two clips for each channel are used to secure the bottom panel to bars 26 and 27 whereas only a single clip is used for each channel to secure the top panel to bar 25. The bottom bar 27 is extendable to maintain the parallelism between the vertical posts 19 and 20 even though the posts are extended to unequal lengths. The bottom end of the top panels are positioned outwardly of and rest against the top portion of the bottom panels.

A plurality of storage brackets 50 are mounted to the exterior walls of trailer 10 (FIG. 1) to receive the horizontally extending feet of each skirt frame when the skirts are swung outwardly and upwardly. The apertures which receive stakes 34 (FIG. 2) may be utilized to secure the feet to brackets 50 which are provided with similar apertures. Thus, by extending a pin through the apertures of the horizontal feet and brackets 50, the skirts may be locked in the upward stored position thereby allowing transportation of the trailer without necessitating disassembly of the skirting. Stakes 34 must be removed from the ground prior to swinging the skirts on sides 11, 12 and 13 outwardly and upwardly against the wall of the trailer.

Mobile home lengths normally include the extended measurement of the tongue 52 beyond the front wall 14 of the home. Due to the variation of lengths of tongues, there is not a standard of wall lengths of various homes. As an example, two different mobile homes may be listed as having a length of 60 feet; however, the actual wall measurement could be 56 or 57 feet. Since the panels and skirt assembly frame will be made in standard lengths, it is necessary to provide the difference of measurement. Thus, the corners between walls 11 and 14 and between walls 13 and 14 will be provided with a corner panel which is fastened in place with sheet metal screws or other fastening devices. Such a corner panel 53 is shown in FIG. 1 and extends from the first skirt assembly 54 mounted to wall 11 to the first skirt assembly 55 mounted to wall 14. A similar corner panel is mounted between the skirt assemblies at the corner of side wall 13 and front wall 14. The sides of the corner panels are made of a flat material and could include channels or ridges. A corner panel 53 extends from the bottom edge of the trailer to an elevation corresponding approximately to the junction of the top and bottom panels of each skirt. A bottom corner panel 56 is then secured to the top corner panel 53 by standard fastening devices such as bolts. The corner panels could be made from one piece of material and cut to the length required. The corner panels are not pivotally connected to the trailer and must therefore be dismanteled prior to trailer transportation.

The vertical posts utilized for the mounting of the panels on the side walls 11 and 13 and rear wall 12 include an outwardly extending top end portion 33. This end portion 33 is not provided on the vertical posts used to mount the top and bottom panels to the forward wall 14 of the trailer. Instead, the vertical post pivotally mounting the panels to wall 14 are straight and are provided with an aperture in the main body of the tube. Thus, the panels project outwardly with respect to wall 14 whereas the panels mounted to side walls 11 and 13 and rear wall 12 are flush with the trailer. A drip shield 63 is secured to wall 14 to prevent rain water from dripping behind the panels into the space beneath the trailer. In addition, the drip cover 63 is a decorative cover over the top ends of the vertical posts and the panels. The drip cover can be fastened to the exterior of the trailer with sheet metal screws or other fastening devices. Of course, the drip shield must be removed prior to trailer transportation.

Since the I-beams 61 and 62 of tongue 52 are welded in place and are nonremovable, it is desirable to design the skirting mounted to wall 14 in three assemblies. One skirt assembly 55 is placed on one side of tongue 52 wheresa a second skirt assembly 57 is provided on the other side of the tongue. The third skirt assembly 58 is mounted to wall 14 and extends between I-beams 61 and 62. This leaves a gap in the skirting both above and below the tongue I-beams between skirt assemblies 55 and 58 and skirt assemblies 57 and 58. Flat pieces of material 59 and 60 are used to bridge these gaps and are fastened in place to the skirt assemblies by sheet metal screws or other fastening devices.

Many variations are contemplated and included in the present invention. For example, the channels and ridges may be secured to the panels by a rivet extending through the channel, panel and the ridge. Alternatively, the channels and panels may be formed into the panel in the event that the panel is produced from a material such as plastic. The panels may also be produced from a material such as aluminum. The post and cross bars may be made from tubing of any shape such as round, square, triangular, rectangular, etc. Another variation included in the present invention is to vary the shape of the clips used to secure the panels to the cross bars.

The channels and ridges function to produce an interlocking slide which is an integral part of each panel. The interlocking slide can be made of many designs and shapes. The outside design of the slide must fit into the inside design of the slide and perform two functions: (a) the panels must be able to slide together; and (b) the interlocking slide must hold the panels securely in a parallel relationship to each other. The sliding panels are mounted to the holding frame by means of the clips. The bottom of each clip is designed so that it will fit into the inside design of the panel interlocking slide. It is further intended that the bottom of the clip be circular in design so that it may swivel slightly to accommodate the changing angle of the lower horizontal telescoping cross bar. To store the skirts, it is a simple operation to remove the ground stakes, contract the panels and hinge them into the upward stored position. The same feature makes it possible for the home owner to gain access to the space under the mobile home at any point he desires.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. Skirting for mounting to a mobile trailer comprising:
   a mounting bracket securable to said trailer;
   a frame having a top end portion pivotally mounted to said bracket, said frame being pivotable on said bracket outward and upward from a vertical position beneath said trailer to a stored position exteriorly against said trailer, said frame including vertical telescopic posts connected
   a top panel mounted on said frame;
   a bottom panel mounted on said frame and telescopically connected to said top panel being extendable therefrom as said posts are telescoped against the ground;
   means mounting said top panel and said bottom panel to said frame;
   said frame including a telescoping cross bar connecting said posts together and positioned adjacent said bottom panel, said cross bar being extendable to maintain parallelism between said posts even though said posts are extended to unequal lengths;
   said frame including a rigid cross bar connecting said posts together and positioned adjacent said top panel;
   said top panel being mounted to said rigid cross bar and said bottom panel being mounted to said telescoping cross bar, said bottom panel and telescoping cross bar being mutually slidable relative to each other, said top panel having a bottom end portion positioned outwardly of and against said bottom panel.

2. The skirting of claim 1 wherein:
   said top panel and said bottom panel each have an interior surface each with a vertically extending channel mounted thereon and an exterior surface each with a vertically extending ridge mounted thereon, said top panel and said bottom panel are telescopically connected together by the ridge on one panel slidably fitting within the channel of the other panel.

3. Skirting for mounting to a mobile trailer comprising:
   a mounting bracket securable to said trailer;
   a frame having a top end portion pivotally mounted to said bracket, said frame being pivotable on said bracket outward and upward from a vertical position beneath said trailer to a stored position exteriorly against said trailer, said frame including vertical telescopic posts connected together;
   a top panel mounted on said frame;
   a bottom panel mounted on said frame and telescopically connected to said top panel being extendable therefrom as said posts are telescoped against the ground;
   means mounting said top panel and said bottom panel to said frame;
   said frame including a telescoping cross bar connecting said posts together and positioned adjacent said bottom panel, said cross bar being extendable to maintain parallelism between said posts even though said posts are extended to unequal lengths;
   said frame including a rigid cross bar connecting said posts together and positioned adjacent said top panel;
   said top panel being mounted to said rigid cross bar and said bottom panel being mounted to said telescoping cross bar, said top panel having a bottom end portion positioned outwardly of and against said bottom panel;
   said top panel and said bottom panel each having an interior surface each with a vertically extending channel mounted thereon and an exterior surface each with a vertically extending ridge mounted thereon, said top panel and said bottom panel being telescopically connected together by the ridge on one panel slidably fitting within the channel of the other panel;
   said means including a plurality of removable clips mounted to said rigid cross bar and said telescoping cross bar, said clips have circular bases movable and rotatable within each channel of said top panel and said bottom panel.

4. The skirting of claim 3 wherein:
   said vertical posts have horizontal feet and further comprising: